United States Patent [19]
Esslinger et al.

[11] Patent Number: 5,245,172
[45] Date of Patent: Sep. 14, 1993

[54] VOICE COIL FOCUSING SYSTEM HAVING AN IMAGE RECEPTOR MOUNTED ON A PIVOTALLY-ROTATABLE FRAME

[75] Inventors: Robert Esslinger, Wilton; Joseph Mulligan, Fairfield, both of Conn.; Lance Garland, Wilsonville, Oreg.; Stephen Roth, Aumsville, Oreg.; Paul Roth, Aumsville, Oreg.

[73] Assignee: United Parcel Service of America, Inc., Atlanta, Ga.

[21] Appl. No.: 882,170

[22] Filed: May 12, 1992

[51] Int. Cl.⁵ ............................................. G01J 1/20
[52] U.S. Cl. ............................... 250/201.2; 250/201.7; 250/566
[58] Field of Search ............... 250/201.2, 201.7, 201.9, 250/566, 568; 235/462, 467, 469, 472; 354/160, 5, 15

[56] References Cited

U.S. PATENT DOCUMENTS

| | | | |
|---|---|---|---|
| 4,558,367 | 10/1985 | Urata et al. | 358/227 |
| 4,563,705 | 1/1986 | Oinoue et al. | 358/227 |
| 4,570,185 | 2/1986 | Arai et al. | 358/227 |
| 4,798,947 | 1/1989 | Baxter | 250/201.2 |
| 4,853,788 | 8/1989 | Murashima et al. | 358/227 |
| 4,924,317 | 5/1990 | Hirao et al. | 358/227 |
| 4,967,279 | 10/1990 | Murashima | 358/227 |
| 5,124,539 | 6/1992 | Krichever et al. | 235/467 |
| 5,168,149 | 12/1992 | Drorkis et al. | 235/467 |

FOREIGN PATENT DOCUMENTS 0226673  8/1985  Fed. Rep. of Germany .
0040110  2/1988  Japan .
0017030  1/1989  Japan .

*Primary Examiner*—David C. Nelms
*Assistant Examiner*—Que T. Le
*Attorney, Agent, or Firm*—James A. Drobile; William H. Murray; Daniel H. Golub

[57] ABSTRACT

An apparatus for focusing an image onto an image receptor is disclosed. The apparatus includes a stationary lens, a rotatable frame that is rigidly connected to the image receptor, and a base. The base is pivotally connected to the rotatable frame about a rotational axis. The image is focused by the stationary lens onto the image receptor by pivoting the rotatable frame about the rotational axis. In an alternate embodiment, an apparatus for focusing an image onto an image receptor includes a stationary lens, a voice coil actuator, a servo loop for driving the voice coil actuator, and an electromechanical transducer for measuring the position of the image receptor. The electromechanical transducer is electrically connected to the servo loop. Connecting means for rigidly connecting the image receptor to the voice coil actuator are also provided. The image is focused by the stationary lens onto the image receptor by driving the voice coil actuator. A method for focusing an image onto an image receptor pivotally connected to a base about a rotational axis is disclosed. The method includes detecting information representative of the distance between a stationary lens and an object being imaged, and pivoting the image receptor about the rotational axis in accordance with the detected information.

13 Claims, 4 Drawing Sheets

VOICE COIL FOCUSING SYSTEM HAVING AN IMAGE RECEPTOR MOUNTED ON A PIVOTALLY-ROTATABLE FRAME

FIELD OF THE INVENTION

This invention relates to the automatic focusing of images onto an image receptor and, in particular, to automatic focusing systems capable of reliably performing successive focusing cycles at high speed over prolonged periods of time.

BACKGROUND OF THE INVENTION

As bar codes and other symbologies used to encode packaging labels grow more dense, the optical path of an electronic scanner often must be focused in order to successfully read the code or symbol. High speed package handling operations which use bar codes or other symbologies to identify packages typically require rapid automatic focusing mechanisms which must operate at high speed for prolonged periods of time. The high package quantities processed by such systems require the automatic focusing mechanism employed to have a very long life. For example, in certain applications, the focusing mechanism may be required to perform as many as one million focusing cycles per year without breakdown.

In conventional automatic focusing systems, image focusing is achieved by holding the focal plane of an image receptor in a stationary position and moving a focusing lens. In such systems, the lens is typically moved by mounting the lens in a screw mount and turning the mount with a small servo motor. Such conventional systems are not suitable for cameras which must be focused and refocused quickly and repetitively over prolonged periods of time. For example, a conventional automatic focusing system could not be successfully employed to perform overhead scanning of a continuous stream of packaging labels of varying height positioned on a rapidly moving belt. Due to the high mass of their moving parts, conventional automatic focusing systems are unable to achieve the very fast focusing slew times required by such applications. In addition, due to the friction and wear between moving parts in conventional automatic focusing systems, such systems are unable to perform continuously in high volume operations for prolonged periods of time.

It is therefore an object of the present invention to provide an automatic focusing system capable of reliably performing in a high speed automated environment for prolonged periods of time.

It is a further object of the present invention to provide an automatic focusing system which does not require the movement of high mass parts to achieve focusing.

It is a still further object of the present invention to provide an automatic focusing system which operates with a minimum of friction and wear between its moving parts.

Further objects and advantages of the invention will become apparent from the description of the invention which follows.

SUMMARY OF THE INVENTION

An apparatus for focusing an image onto an image receptor is disclosed. In a preferred embodiment, the apparatus includes a stationary lens, a rotatable frame that is rigidly connected to the image receptor, and a base. The base is pivotally connected to the rotatable frame about a rotational axis. The image is focused by the stationary lens onto the image receptor by pivoting the rotatable frame about the rotational axis.

In an alternate embodiment of the present invention, an apparatus for focusing an image onto an image receptor includes a stationary lens, a voice coil actuator, a servo loop for driving the voice coil actuator and an electromechanical transducer for measuring the position of the image receptor. The electromechanical transducer is electrically connected to the servo loop. Connecting means for rigidly connecting the image receptor to the voice coil actuator are also provided. The image is focused by the stationary lens onto the image receptor by driving the voice coil actuator.

A method for focusing an image onto an image receptor pivotally connected to a base about a rotational axis is also disclosed. The method includes detecting information representative of the distance between a stationary lens and an object being imaged, and pivoting the image receptor about the rotational axis in accordance with the detected information.

DETAILED DESCRIPTION OF THE PREFERRED EMBODIMENT

Figure 1:
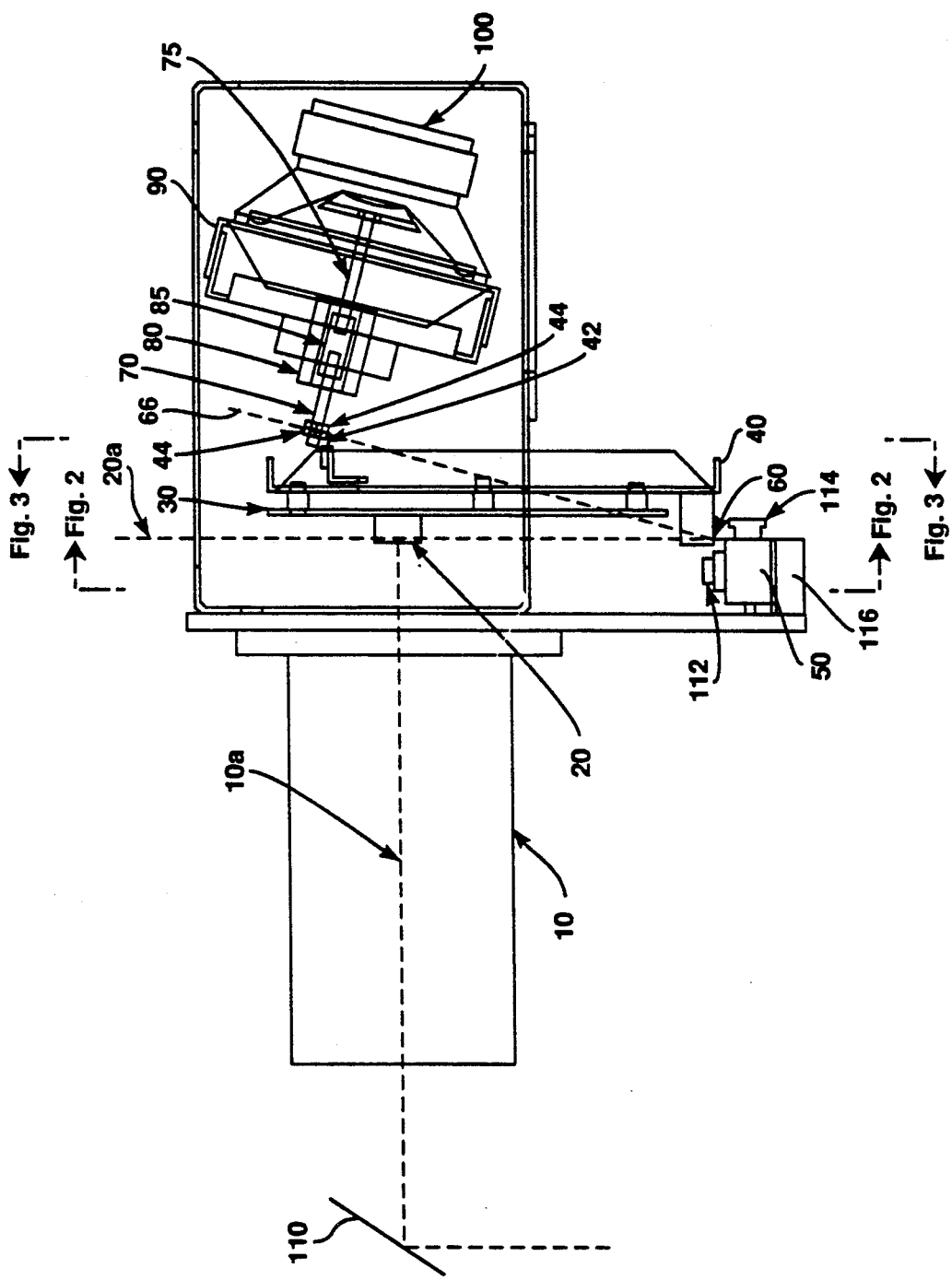
FIG. 1 shows a first cross-sectional view of a preferred embodiment of the present invention.
Figure 2:
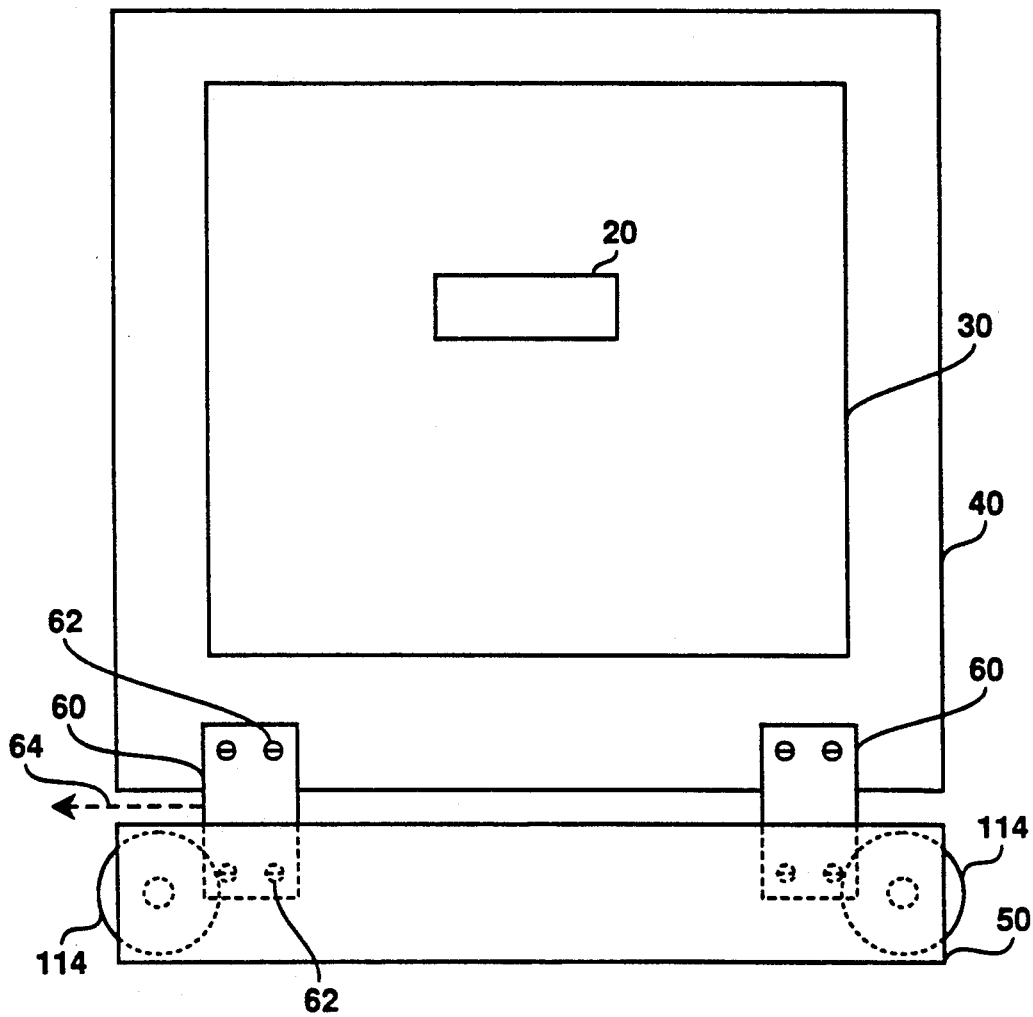
FIG. 2 shows a second cross-sectional view of a preferred embodiment of the present invention.
Figure 3:
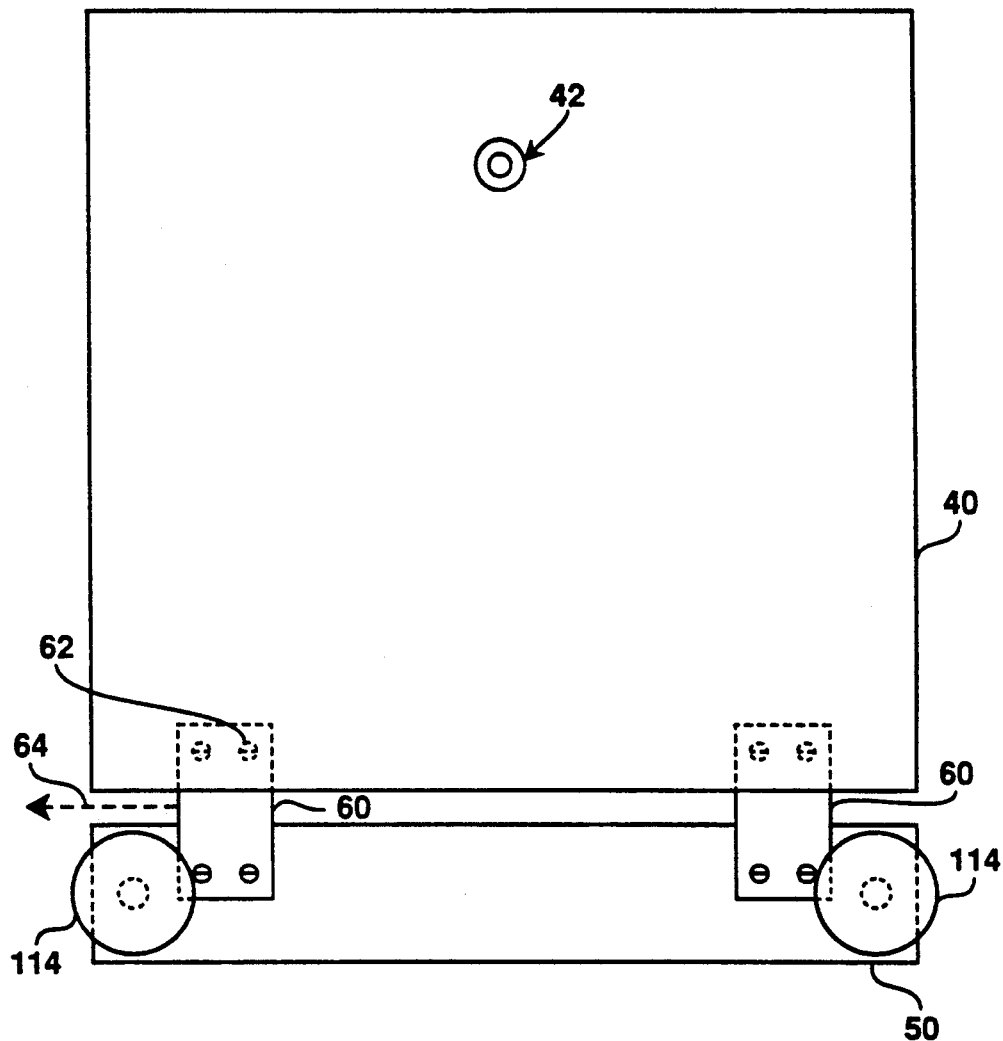
FIG. 3 shows a third cross-sectional view of a preferred embodiment of the present invention.

Referring now to FIGS. 1-3, there is shown a voice coil focusing system according to a preferred embodiment of the present invention. The system includes stationary lens 10 for focusing an image traveling along optical path 10a onto image receptor 20. Image receptor 20 is preferably a charge coupled device (CCD) having focal plane 20a. Image receptor 20 is rigidly mounted on circuit board 30 which in turn is rigidly mounted on rotatable frame 40. Base 50 and rotatable frame 40 are pivotally connected by hinges 60. Rotatable frame 40 and first connecting rod 70 are rigidly connected at actuating point 42. Second connecting rod 75 rigidly connects the front face of voice coil actuator 100 to electromechanical transducer core 85. Mounting chassis 90 is provided for rigidly securing the body of electromechanical transducer 80 above the front face of voice coil actuator 100. Electromechanical transducer core 85 rigidly connects first connecting rod 70 and second connecting rod 75 without touching the outer body of electromechanical transducer 80.

In the preferred embodiment, the position of image receptor 20 is controlled by three points which form an Isosceles triangle with base 50. The two lower vertices of the triangle are connected to base 50 at hinges 60. The apex of the triangle is connected to voice coil actuator 100 via in-line electromechanical transducer core 85 and connecting rods 70, 75. The position of image receptor 20 (and focal plane 20a) is measured by electromechanical transducer 80, which sends a position feedback signal to the servo drive loop. In the preferred embodiment, electromechanical transducer 80 is an absolute position feedback device such as a linear differential variable transformer (LDVT) having an inner core 85. A suitable LDVT for use in connection with the present invention is the Schaevitz model 050 HR AC LDVT. The use of an absolute position feedback device ensures that focal plane 20a is precisely positioned and also serves to quickly stabilize focal plane 20a at a desired position. In the preferred embodiment, base 50 is fastened to outer base 116 with adjustment thumbwheels 114 and lockscrews 112.

According to the preferred embodiment, voice coil actuator 100 provides the actuating force for positioning rotatable frame 40. Voice coil actuator 100 is preferably formed from a conventional acoustic loudspeaker. The voice coil of the acoustic loudspeaker preferably serves as the rear bearing of and provides return resilience for the actuator link formed by connecting rods 70, 75 and transducer 80. The voice coil diaphragm also aids the servo damping. A suitable loudspeaker for use in connection with the present invention is a Realistic TM model 40-1325 3.5" speaker rated at 20 watts and 8 ohms. Such a loudspeaker provides for movement of focal plane 20a over a range of approximately 0.030"-0.050". Since conventional acoustic loudspeakers are typically non-linear, an LDVT is preferably employed in a servo loop with voice coil actuator 100 to remove any non-linearity from the system.

Each hinge 60 is preferably formed from a rectangular piece of flat brass shim stock about 0.020" in thickness, although other materials (including beryllium copper) and thicknesses may be used. Screws 62 secure one end of each hinge 60 to rotatable frame 40, and the other end of each hinge 60 to stationary base 50. When hinges 60 are formed of rectangular pieces of brass shim and secured as shown, each hinge 60 is able to flex (or pivot) about rotational axis 64 when an actuating force is applied to rotatable frame 40 at actuating point 42. In the preferred embodiment, image receptor 20 is oriented so that focal plane 20a is perpendicular to and intersects axis 64.

According to the preferred embodiment, connecting rod 75 is affixed to rotatable frame 40 at actuating point 42 such that a right angle is formed between connecting rod 75 and a reference line 66. Reference line 66 is perpendicular to and intersects axis 64. Connecting rod 75 is preferably threaded at one end. The threaded end of connecting rod 75 passes through an opening affixed to rotatable frame 40 at actuating point 42. Connecting rod 75 is then affixed to rotatable frame 40 at actuating point 42 by hex nuts 44. In a preferred embodiment, hex nuts 44 may be used to calibrate a nominal position of focal plane 20a such that an object in the middle of the system's focusing range is focused on image receptor 20 when no force is applied by voice coil actuator 100. Also as part of the initial calibration, focal plane 20a is made perpendicular to optical path 10a by turning adjustment thumbwheels 114 to rotate the angle of base 50 relative to optical path 10a. When the proper angle is found, base 50 is secured to outer base 116 with lock screws 114.

In a preferred embodiment, mirror 110 is provided for reflecting an image traveling along optical path 10a from a vertical to a horizontal direction. Mirror 110 allows the focusing system of the present invention to be positioned horizontally (as shown in FIG. 1) while performing overhead scanning of a continuous stream of packaging labels of varying height positioned on a rapidly moving belt. In an alternate preferred embodiment, the focusing system of the present invention may be oriented in a vertical direction to perform such overhead scanning. In this alternate embodiment, a spring (not shown) is preferably mounted between rotatable frame 40 and chassis 90 to counteract the force of gravity and establish the nominal position of focal plane 20a.

Figure 4:
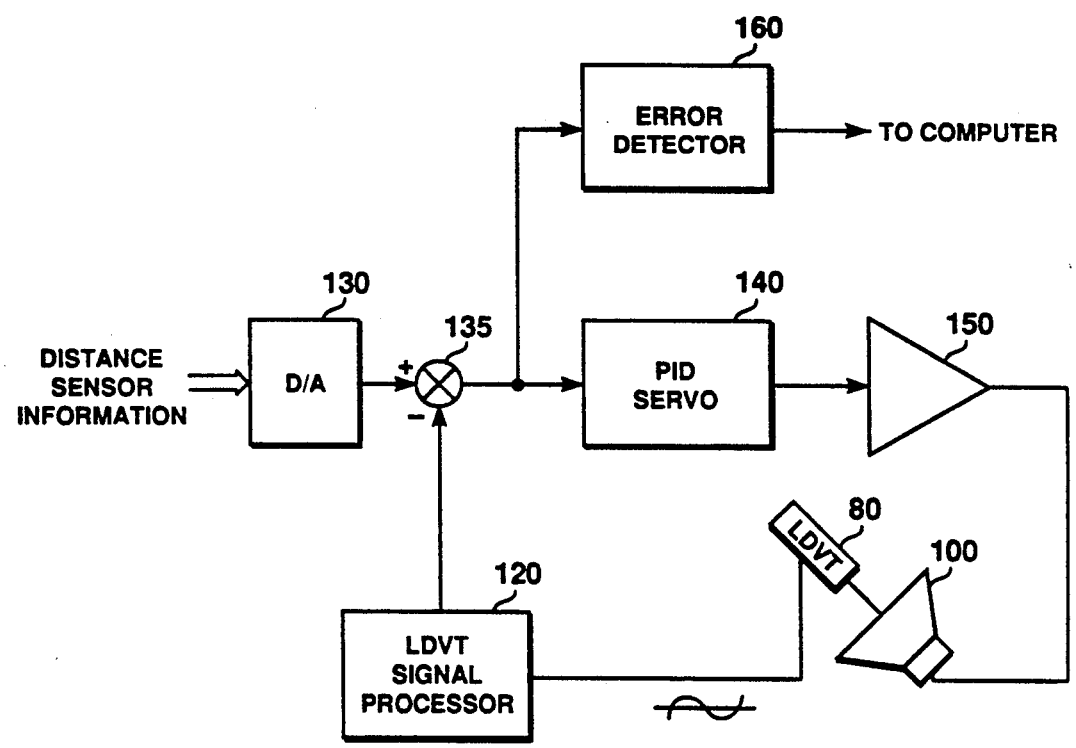
FIG. 4 is a block diagram illustrating the operation of a preferred servo loop according to the present invention.

Referring now to FIG. 4, there is shown a block diagram illustrating the operation of a preferred servo loop for driving voice coil actuator 100 according to the present invention. LDVT signal processor 120 is provided for converting the AC output of LDVT 80 to a DC voltage proportional to deflection distance. Distance information from a sensor (not shown) is provided to D/A converter 130. The distance information provided is representative of the distance between stationary lens 10 and an object being imaged. An error signal representing the difference between the output of LDVT signal processor 120 and the output D/A converter 130 is determined by differential amplifier 135 and provided to PID servo 140. The output of PID servo 140 is amplified by power amplifier 10 to drive voice coil actuator 100. Error detector 160 is provided to detect any failures in the servo loop. Error detector 160 sends an error bit to a computer if a failure in the loop is detected.

A preferred embodiment of the present invention has been tested for focusing speed and has achieved a focusing settling time of 20 ms. In addition, life tests of the present invention show more than 58 million successful focusing cycles without failure.

The present invention may be embodied in other specific forms without departing from the spirit or essential attributes of the invention. Accordingly, reference should be made to the appended claims, rather than the foregoing specification, as indicating the scope of the invention.

What is claimed is:

1. An apparatus for focusing an image onto an image receptor comprising:
   (A) a stationary lens;
   (B) a rotatable frame, said image receptor being rigidly connected to said rotatable frame; and
   (C) a base, said base being pivotally connected to said rotatable frame about a rotational axis, wherein said image is focused by said stationary lens onto said image receptor by pivoting said rotatable frame about said rotational axis.

2. The apparatus of claim 1, wherein said image receptor has a focal plane which intersects and is perpendicular to said rotational axis.

3. The apparatus of claim 1, wherein said image receptor is comprised of a charge coupled device.

4. The apparatus of claim 1, further comprising a hinge for pivotally connecting said base and said rotatable frame.

5. The apparatus of claim 4, wherein said hinge is comprised of a flat piece of flexible metal having first and second ends, said first end being rigidly connected to said rotatable frame, said second end being rigidly connected to said base.

6. An apparatus for focusing an image onto an image receptor comprising:
   (A) a stationary lens;
   (B) a voice coil actuator;
   (C) a servo loop for driving said voice coil actuator;
   (D) an electromechanical transducer for measuring the position of said image receptor, said electromechanical transducer being electrically connected to said servo loop; and (E) connecting means for rigidly connecting said image receptor to said voice coil actuator wherein said image is focused by said stationary lens onto said image receptor by driving said voice coil actuator.

7. The apparatus of claim 6, wherein said electromechanical transducer is a linear differential variable 8. The apparatus of claim 6, wherein said voice coil actuator is comprised of an acoustic loudspeaker.

9. A method for focusing an image onto an image receptor, said image receptor being pivotally connected to a base about a rotational axis, comprising the steps of:

(A) detecting information representative of the distance between a stationary lens and an object being imaged; and (B) pivoting said image receptor about said rotational axis in accordance with said detected information.

10. The method of claim 9, wherein step (B) comprises the step of driving a voice coil actuator in accordance with said detected information to pivot said image receptor about said rotational axis.

11. The method of claim 10, wherein said image receptor is mounted on a rotatable frame which is pivotally connected to said base, and said voice coil actuator is rigidly connected to said rotatable frame.

12. The method of claim 9, wherein said image receptor has a focal plane which intersects and is perpendicular to said rotational axis.

13. The method of claim 12, wherein said image receptor has an optical path which is perpendicular to said focal plane.

* * * * *